United States Patent

Murphree

[15] 3,642,999

[45] Feb. 15, 1972

[54] SIMULATOR FOR CONTINUOUS FREQUENCY MODULATED SONAR

[72] Inventor: Francis J. Murphree, Winter Park, Fla.

[73] Assignee: The United States of America as represented by the Secretary of the Navy

[22] Filed: May 11, 1970

[21] Appl. No.: 36,237

[52] U.S. Cl..............................................35/10.4
[51] Int. Cl. ...........................................G06g 7/78
[58] Field of Search..................................35/10.4

[56] References Cited

FOREIGN PATENTS OR APPLICATIONS 929,487    6/1963    Great Britain..........................35/10.4

OTHER PUBLICATIONS

Damon, M. H., Jr., Electronics, Mar. 25, 1960, "Tape Target Classifier Trans Sonar Operators," pp. 65–69.

*Primary Examiner*—Rodney D. Bennett, Jr.
*Assistant Examiner*—G. E. Montone
*Attorney*—Richard S. Sciascia and John W. Pease

[57] ABSTRACT

A multi-band-pass filter circuit with sequential detector-sampling means utilizing an azimuth function generator, programmable oscillator, lost time function generator means, range time base and range attenuator filter means together with a cathode-ray tube display (CRT) means and audio equipment for simulating realistically on the CRT and in the audio spectrum sonar echo signals representative of variations of target range, azimuth, conditions of relative movement, and including the effects of reverberation, lost time, and ambient, own ship and target noise conditions.

5 Claims, 6 Drawing Figures

FRANCIS J. MURPHREE
INVENTOR

FRANCIS J. MURPHREE
INVENTOR

FRANCIS J. MURPHREE
INVENTOR

By *[signature]*

Attorney

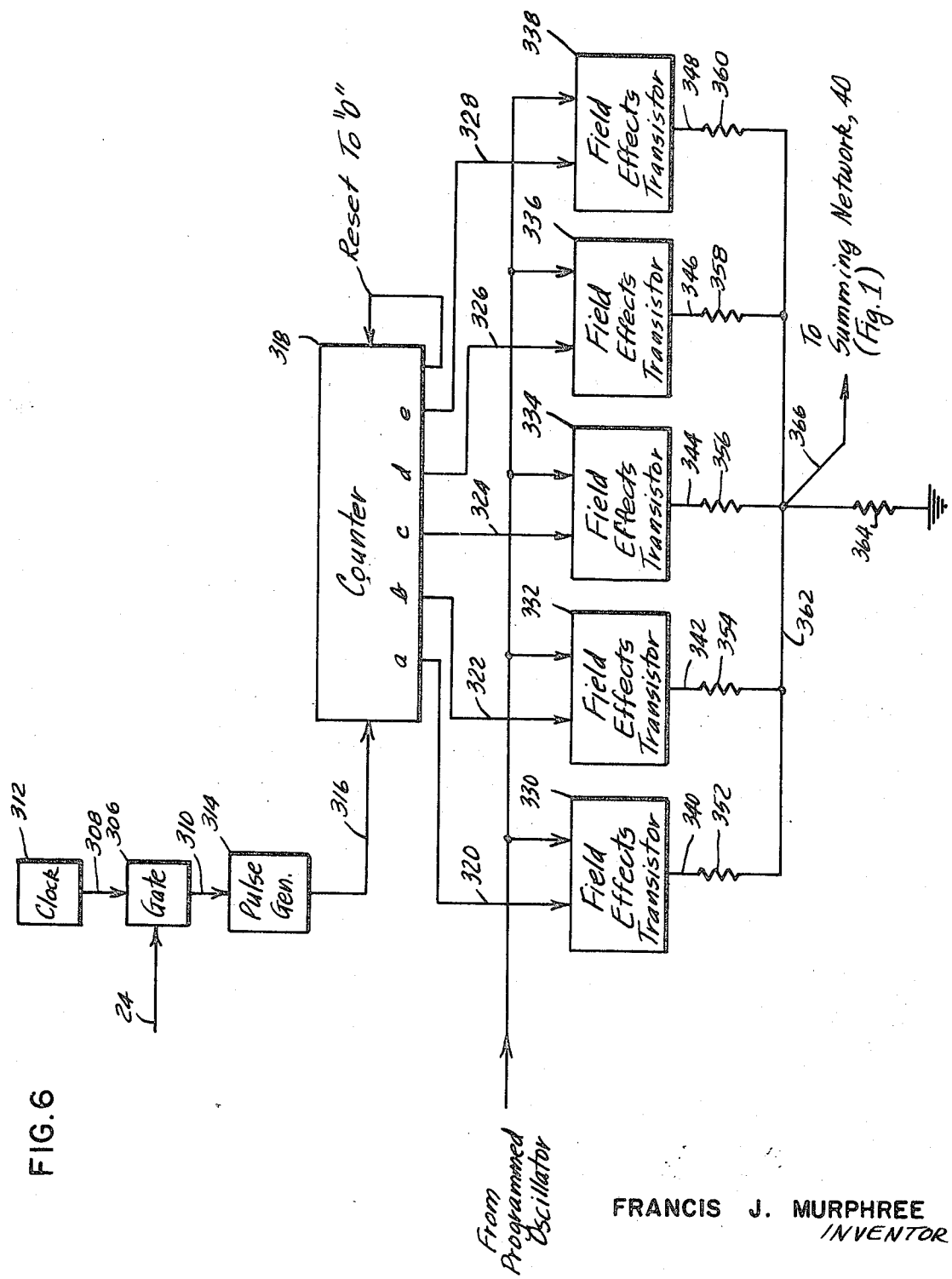

SIMULATOR FOR CONTINUOUS FREQUENCY MODULATED SONAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Training in the use of CTFM sonars has been accomplished in the past by operation of actual field equipment or by use of recordings made during such operation which are played back through a similar system at some later time. The use of actual equipment is costly while the use of recordings lacks flexibility for variation of conditions.

The object of the subject invention is to provide means for simulating the performance of a CTFM sonar to the extent that the simulated signal sounds realistic and appears realistic on a cathode-ray tube (CRT) and which is at the same time variable at will for the introduction of selected variable problems.

SUMMARY OF THE INVENTION

A simulator having a CRT display and audio system wherein problem variation signals, reverberation, ambient noise, own ship noise and target noise are introduced to a system including an azimuth function generator, programmable oscillator, azimuth attenuator means and summing networks for application to a plurality of band-pass filter circuits, the outputs being applied to an audio system and through detectors and a detector sequential sampler to the CRT display and wherein signals from a range time base source is used in conjunction with a lost time function generator and lost time gate means to produce in the audio system and on the CRT a realistic simulation of the loss of signal between sequences of transmitted signal.

DESCRIPTION OF THE DRAWINGS

FIG. 6 is a block diagram of a suitable azimuth attenuator.

DESCRIPTION OF THE PREFERRED EMBODIMENT

Figure 1:
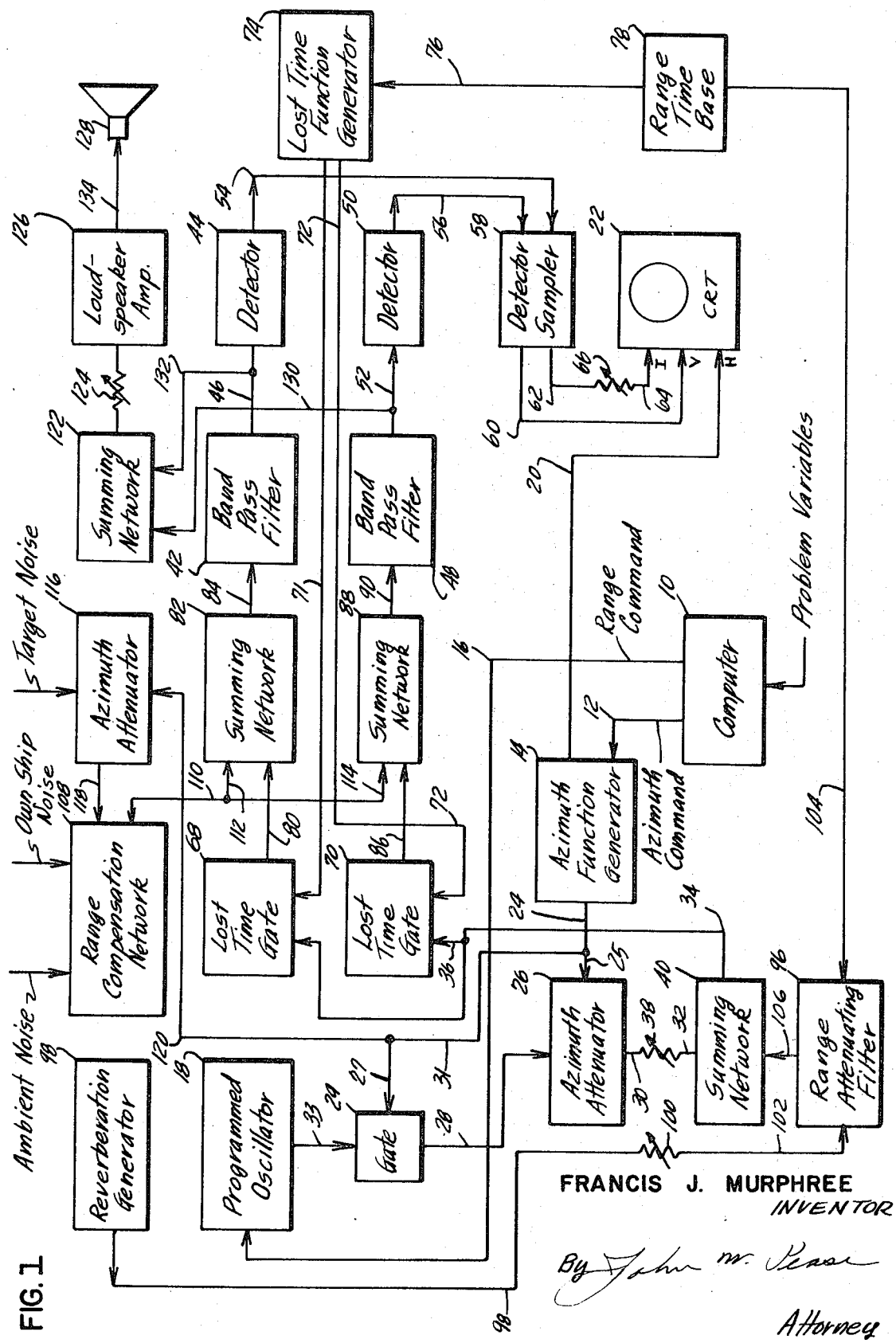
FIG. 1 is a block diagram of a continuous transmission frequency modulated (CTFM) sonar simulator embodying the invention.

Referring to FIG. 1 of the drawing, the simulator shown therein provides the function of introducing problem variables to a computer 10 which provides an azimuth command signal on line 12 to an azimuth function generator 14 and a range command signal on a line 16 to a programmable oscillator 18. The azimuth function generator provides on a line 20 the horizontal scan input to a cathode-ray tube display (CRT) 22. The azimuth function generator also provides one input on lines 24 and 25 to a first azimuth attenuator 26. The second input to the azimuth attenuator 26 is provided on a line 28 from the oscillator 18 via a line 33 and gate 29. Gate 29 receives an input from the azimuth function generator 14 via lines 24, 31 and 27. The output from azimuth attenuator 26 is passed on lines 30, 32 and 34 and 36 via a gain control 38 and a first summing network 40 to a plurality of band-pass filter channels, each including a band-pass filter and associated detector identified hereinafter. The drawing for simplicity is limited to two channels constituting a band-pass filter 42 and associated detector 44 connected by a line 46 and a band-pass filter 48 and detector 50 connected by a line 52. In an actual simulator some 30 or more band-pass filter channels may be employed. The output of detectors 44 and 50 are passed on lines 54 and 56 to a detector sampler 58 for sequentially sampling the band-pass channel detectors 44 and 50. One output of the detector sampler 58 is passed on line 60 to provide a vertical scan input to the CRT 22. A second output from the detector sampler 58 via lines 62, 64 and a gain 66 provide the intensity of brightness input to the CRT 22. The portion of the circuit of FIG. 1 thus far described relates to the introduction of signals responsive to range and azimuth commands.

Figure 2:
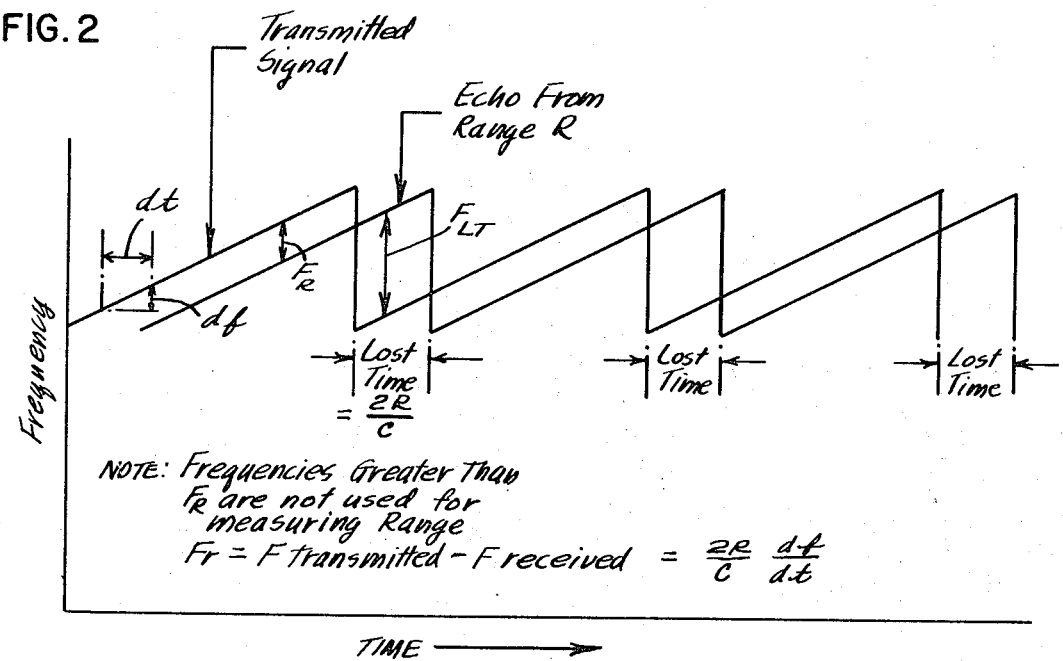
FIG. 2 is a graph of frequency and time relation between transmitted and maximum range received signals for a CTFM sonar provided to better understand the lost time signal factor.

However, a realistic simulation of actual CTFM sonar requires the introduction of "lost time" function. As shown in FIG. 2, this is the period of loss of signal between repeated transmissions. "Lost time" is caused by the fact that immediately after the modulated sawtooth transmitted signal ceases its transmission signal and returns to its starting point for the next signal, the difference between the frequency being transmitted and that being returned from the target or scatterer, indicated as $F_{LT}$, is too great to pass through the receiver filters. "Lost time" lasts for 2R/C seconds, i.e., the time required for the sound to propagate to a range R and to return. For example, if a hydrophone (not shown) is pointed at a target (not shown) 800 yards distant from which an echo is being received, at the instant the sawtooth transmission signal returns to its retransmission starting point the echo would apparently cease for 1 second. Nearer targets would cease for shorter intervals. The echo would then be heard until "flyback" again occurred and the cycle repeated.

To simulate this phenomena, "lost time" gates 68 and 70 (see FIG. 1) are provided for the respective band-pass channels shown in FIG. 1 receiving inputs from respective lines 34 and 36 and inputs on lines 71 and 72 from a "lost time" function generator 74 which receives its input on line 76 from a time base pulse source 78 identified as a range time base which provides one cycle of transmission when the transmitted signal begins and one cycle of transmission when the transmitted signal ends. Outputs from the respective "lost time" gates 68 and 70 are passed respectively via line 80, summing network 82 and line 84 to band-pass filter 42 and via line 86, summing network 88 and line 90 to band-pass filter 48. The summing networks 40, 82 and 88 are provided because of additional phenomena of reverberation and noise as will be presently described hereinafter.

Realistic simulation also requires simulation of reverberation caused by sound scattered from bottom, surface and volume of the water which may be heard from all ranges and bearings and would show on the CRT. Simulation is also required for ambient, own ship and target noises which may also be present.

To simulate reverberation, I provide a reverberation generator 94 connected via line 98, gain control 100 and line 102 as one input to a range attenuation filter 96. The second input to the range attenuation filter is obtained from the range time base 78 via a line 104. The output of the range attenuation filter is connected as an input to the summing network 40 via a line 106.

To simulate ambient and own ship noise, a range compensation network 108 is arranged for connection to source of ambient and own ship noise indicated and its output is passed on lines 110, 112 and 114 to respective summing networks 82 and 88. The range compensation network 108 is designed to have a frequency response corresponding to that of the receiver of the particular CTFM sonar being simulated.

Target noise is simulated by providing a second azimuth attenuator 116 connected to receive an input from a target noise source indicated and from the azimuth function generator 14 via lines 24, 31 and 120 and to provide an output to the range compensation network 108 via a line 118.

To provide audio as well as visual indication of display signal, an audio system including a summing network 122, gain control 124, loudspeaker amplifier 126 and loudspeaker 128, is provided. Input signals for the summing network are obtained from the band-pass filter channels via lines 130 and 132 and passed from the summing circuit 122 through the gain control 124, loudspeaker amplifier 126 and a line 134 to the loudspeaker 128.

Figure 3:
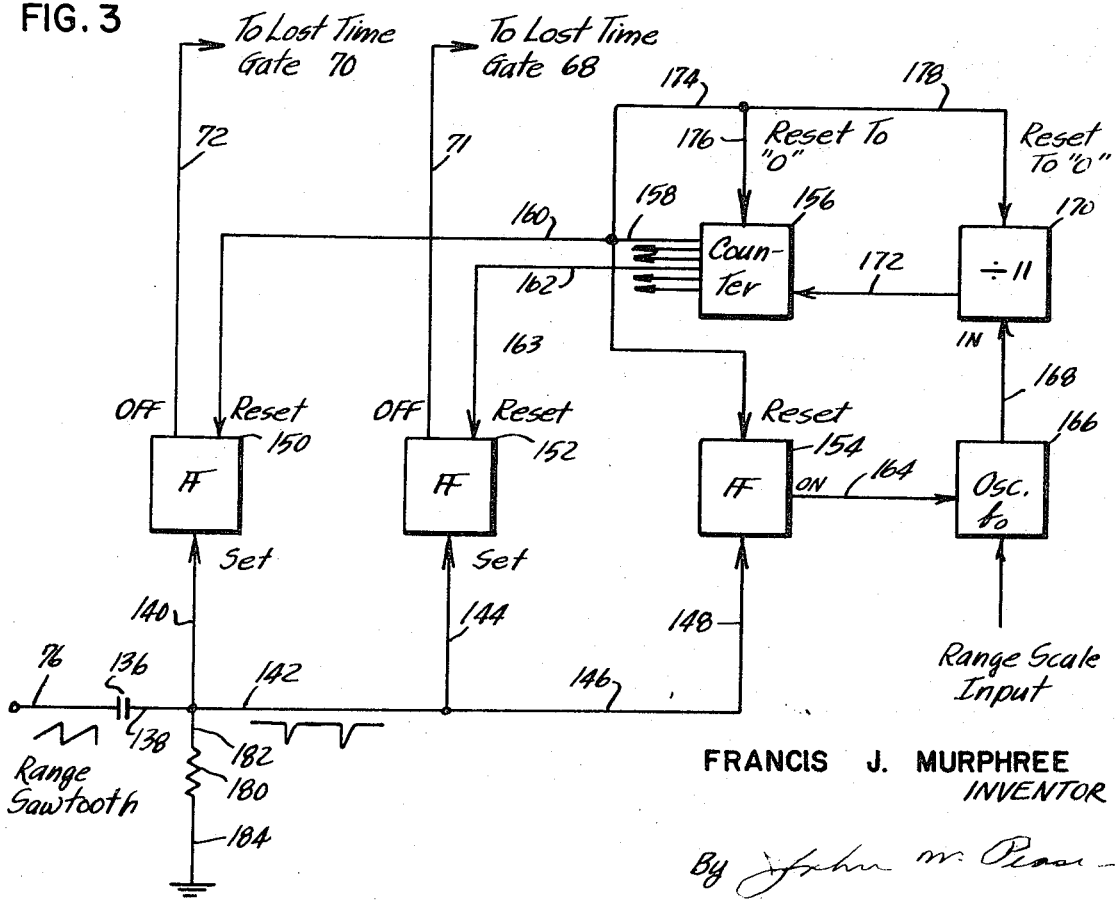
FIG. 3 is a schematic drawing of one suitable lost time function generator shown in block in FIG. 1.

Referring to FIG. 3, there is shown in block diagram one suitable circuit for a "lost time" function generator. In FIG. 3, the incoming range sawtooth signal indicated is received on line 76 from the range time base device 78 shown in FIG. 1 and is passed through a capacitive coupling 136 and thence on lines 138, 140, 142, 144, 146 and 148, as pulses, indicated, to set respective flip-flops 150, 152 and 154 in "ON" condition. Flip-flops 150, 152 and 154 are reset to "OFF" condition from a counter 156 via lines 158, 160, 162 and 163. Flip-flop 154 provides an "ON" signal pulse via line 164 to an oscillator 166 which provides time signals to the counter 156 via line 168, a divider 170 and a line 172. The counter is connected internally so that each time a pulse is applied to its input a logical one shifts from one output connection to the next higher connection. The counter 156 and the divider 170 are actuated to reset position when the "one" reaches the upper or last output via lines 174, 176 and 178. The output of flip-flops 150 and 152 provides the input signals for the respective "lost time" gates 70 and 68 via lines 72 and 71 (see FIG. 1). A resistor 180 (see FIG. 3) is connected via lines 182 and 184 to ground indicated to provide with capacitor 136 a differentiating network.

Figure 4:
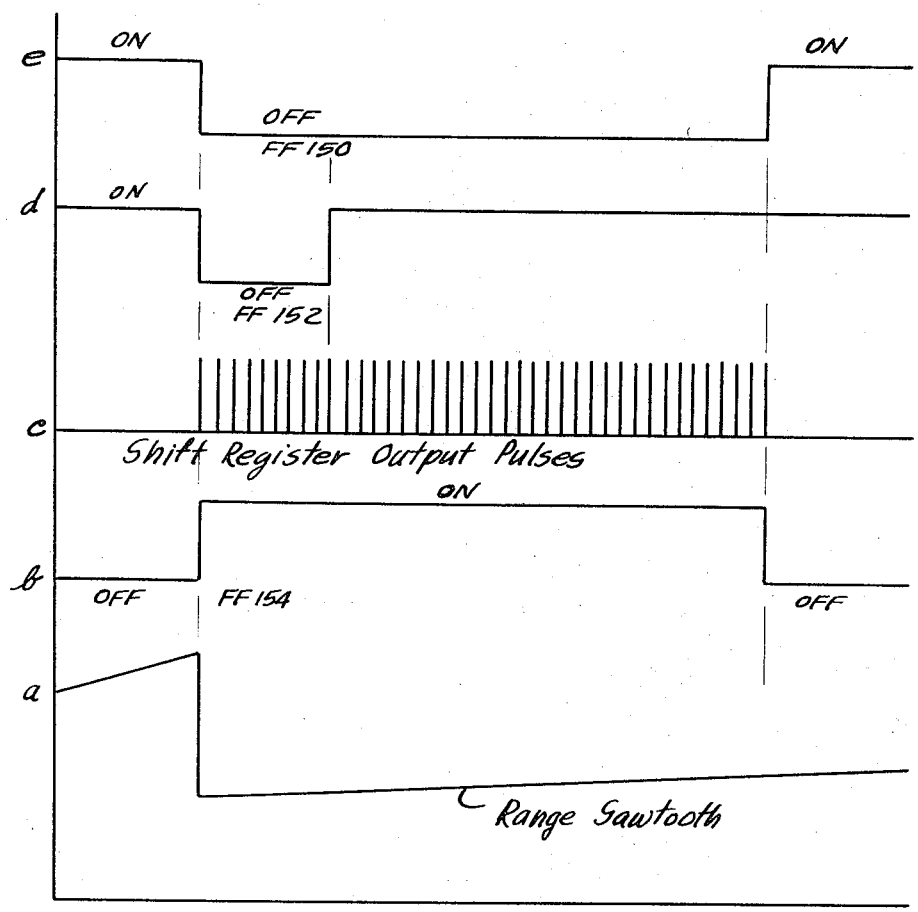
FIG. 4 is a set of time curves constituting a timing diagram for the lost time generator function.

FIG. 4 indicates by curves the operation of the "lost time" function generator of FIG. 3. Curve $a$ indicates the range sawtooth signal coming in on line 76. This signal (see FIG. 3) is converted to a series of pulses, indicated on line 142, to activate flip-flops 150, 152 and 154 to "ON" condition. Curve $b$ indicates the "ON" condition of flip-flop 154. Curve $c$ indicates the counter sequential output pulses. Curve $d$ indicates the "OFF" condition of flip-flop 152 and curve $e$ indicates the "OFF" condition of flip-flop 150. Flip-flops 150 and 152 in turn hold "lost time" gates 70 and 68 in "OFF" condition by output signals on lines 72 and 71.

From FIG. 3 it is apparent that the complete "lost time" cycle can be controlled by proper choice of frequency $f_o$ of the oscillator 166. Once $f_o$ is properly related to the "lost time" on a particular range scale, then if the scale is halved $f_o$ would have to be doubled, and so on for other relations.

Figure 5:
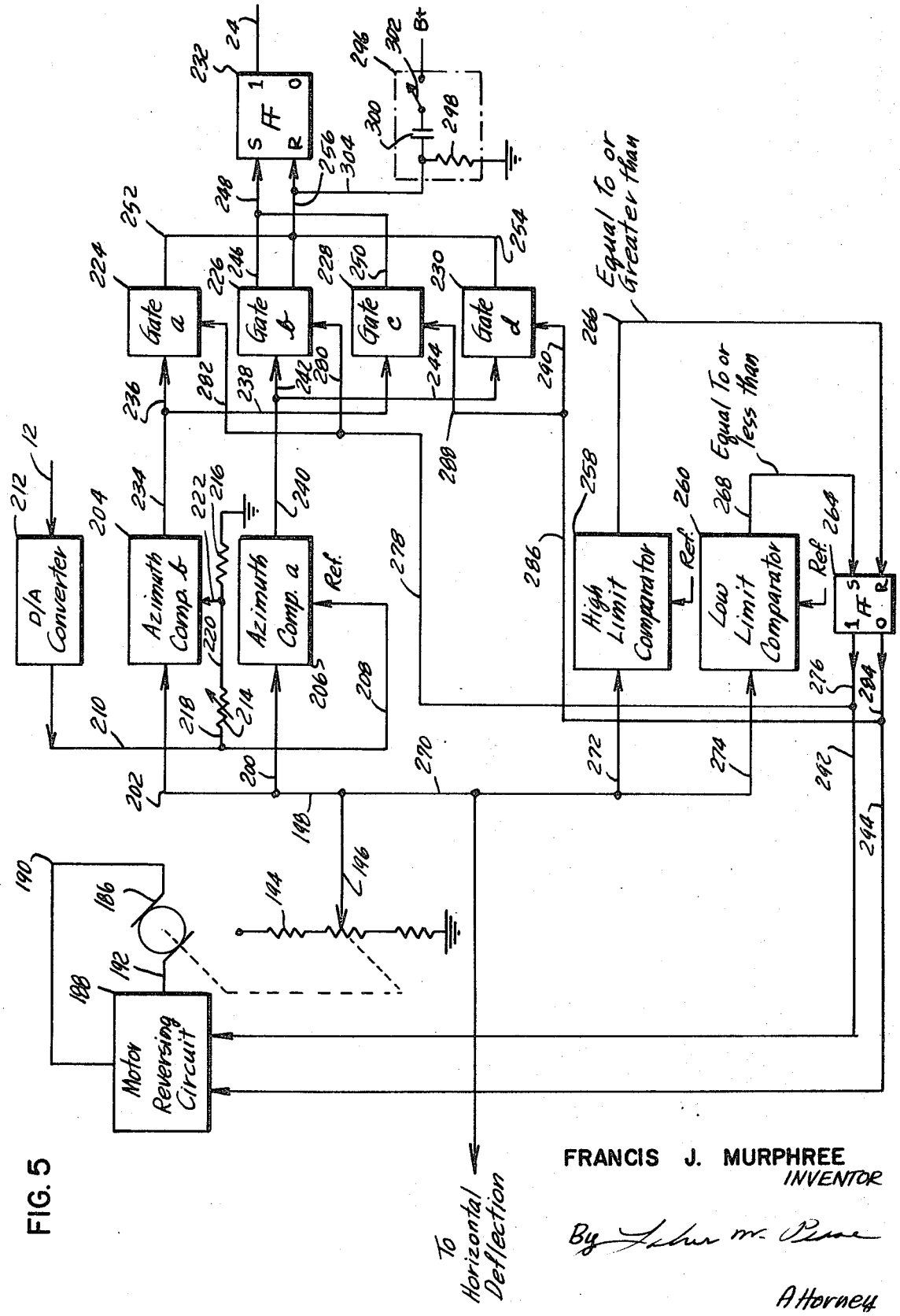
FIG. 5 is a block diagram of one suitable azimuth function generator.

FIG. 5 is one suitable arrangement for the azimuth function generator shown in block form at 14 in FIG. 1. As shown in FIG. 5, a reversible motor 186 having a motor reversing circuit 188 connected thereto by lines 190 and 192 is provided to drive a potentiometer 194 having an arm 196. The voltage from the potentiometer arm 196 is triangular in waveform and is used to deflect the CRT beam horizontally and is also compared with computer generated azimuth reference voltages to generate azimuth gates. Thus, the potentiometer arm is connected via lines 198, 200 and 202 as inputs of azimuth comparators 204 and 206. The reference voltage applied to azimuth comparator 206 is derived via lines 208 and 210 from a digital to analog D/A converter 212 which changes a digital number corresponding to an azimuth command (the target appears at this azimuth) to a direct current voltage. The azimuth command is received from the problem computer 10 of FIG. 1 via line 12. The same voltage attenuated by resistance networks 214 and 216 and connected by lines 218, 220 and 222, is used also as the reference for azimuth comparator 204.

Azimuth comparators 204 and 206 are connected through gates 224, 226, 228 and 230 as indicated to a normally "OFF" flip-flop 232. Thus, azimuth comparator 204 is connected to gates 224 and 228 via lines 234, 236 and 238. Azimuth comparator 206 is connected to gates 226 and 230 through lines 240, 242 and 244. Gates 226 and 228 are connected to flip-flop 232 via lines 246, 248 and 250 and gates 224 and 230 are connected to flip-flop 232 via lines 252, 254 and 256. The output of flip-flop 232 is connected via lines 24, 31, 27 to the gate 29 of FIG. 1. A high-limit comparator 258 and low-limit comparator 260 are connected to a flip-flop 264 via respective lines 266 and 268, and are actuated from the voltage of the potentiometer arm 196 via lines 270, 272 and 274. The output of flip-flop 264 is used to actuate the gates 224 and 226 via lines 276, 278, 280 and 282 and to operate the gates 228 and 230 via lines 284, 286, 288 and 290. The output of flip-flop 264 is also used to operate the motor reversing circuit 188 via lines 276, 292, 284 and 294.

To describe the operation of the azimuth function generator of FIG. 5, assume that the voltage across the potentiometer arm 196 is initially lower than the trigger level of comparators 204 and 206 and that it begins to increase. As the voltage crosses the reference level of comparator 206 the comparator generates a pulse that is applied through gate 226 to the set input of flip-flop 232 (assumed to have been in "OFF" condition previously). A logic "one" appears at the output of flip-flop 232 and turns on the gate 29 of the programmable oscillator 18 of FIG. 1. As the voltage continues to increase it crosses the reference of azimuth comparator 204. The resultant trigger pulse is applied through gate 224 to the reset input of flip-flop 232, turning it "OFF" and hence closing the gate 29 of the programmable oscillator 18. As the potentiometer 194 continues to rotate the voltage across its arm 196 rises to some maximum value. At this point (or for any greater voltage) the high-limit comparator 258 triggers, applying a signal to the reset terminal R of flip-flop 264, changing its output to zero and hence closing gates 224 and 226. This action also causes the polarity of the voltage applied to the motor 186 to reverse via the motor reversing circuit 188 making the motor rotate in the opposite direction. The voltage across the potentiometer arm then begins to decrease. When the voltage reaches a predetermined lower point azimuth comparator 204 triggers and through gate 228 applies a pulse to the set input S of flip-flop 232. This turns on the programmable oscillator 18, FIG. 1, via gate 29 as before. When the potentiometer arm voltage reaches a still lower point azimuth comparator 206 operates, applying a pulse through gate 230 to the reset of flip-flop 232 shutting off the oscillator 18 via gate 29. As the potentiometer rotation continues the voltage across its arm reaches a value below which the low-limit comparator 260 triggers and applies a signal to the set input of flip-flop 232. This causes a "one" to appear at its output which reverses the direction of the motor and opens gates 224 and 226. Gates 228 and 230 are closed. The cycle is then repeated.

A manually operated reset circuit 296 comprising a resistor 298, a capacitor 300 and switch 302 are connected as shown to a source of positive voltage indicated and by line 304 to the reset R of flip-flop 232, is provided to reset flip-flop 232 to "OFF" condition if by chance it starts in the "ON" condition when power is first applied.

Usually there would be more than one target, or a given target may consist of a number of distinct highlights so that the computer 10 must be able to handle this problem. In addition, use of more than one programmable oscillator will be necessary whenever the problem results in more than one target within a given bearing sector.

FIG. 6 shows a suitable circuit for the azimuth attenuators 26 and 116 of FIG. 1. In the azimuth attenuator of FIG. 6, the azimuth gate signal from the azimuth function generator 14 turns on a gate 306 connected by lines 308 and 310 to a clock 312 and to a pulse generator 314 and thence via line 316 to a counter (or shift register arrangement) 318. Counter 318, through terminals $a$, $b$, $c$, $d$, $e$ and lines 320, 322, 324, 326 and 328, is connected to the respective gates of field effect transistors (FET's) 330, 332, 334, 336 and 338. The FET's (source-drain) are connected respectively by lines 340, 342, 344, 346 and 348 through respective resistors 352, 354, 356, 358 and 360 to a common line 362 connected through a resistor 364 to ground indicated. When gate 306 is turned on, the clock 312 applies a signal to pulse generator 314 whose output actuates counter 318. Successive pulses cause output signals to appear sequentially at terminals $a$ through $e$ and turn on the FET's 330, 332, 334, 336 and 338 sequentially allowing, dependent upon the selected values of resistors 350 to 358, smaller or larger signals from the programmed oscillator 18 to appear across the output resistor 364 of the azimuth attenuator. The attenuated signal from the azimuth attenuator is taken on a line 366 to the associated summing network of FIG. 1. It is evident that as many steps as desired may be employed to approximate any desired target-beam response curve.

Operation

Assume that a fixed, point target is at a range R and azimuth $\theta$ relative to the sonar. Under these conditions each time the receiving hydrophone scans past the target an echo of frequency $f=(2R/C)(df/dt)$ will be heard on the loudspeaker and displayed on the CRT, where $C$ is the velocity of sound in water and $df/dt=k$ is the rate in cycles per second at which the transmitted frequency is being changed (see FIG. 2). Thus, if $2R/C=1$ second and $df/dt=1,000$ cycles per second per second, $f=1\times1,000=1,000$ cycles/sec. A target twice as distant would return an echo of 2,000 cycles per second; one-half as far would return an echo of 500 cycles/sec. The range scale is changed by increasing or decreasing $df/dt$ so that a given frequency does not correspond to a single range.

If relative motion exists between the sonar platform and the target the echo frequency $$f \cong \frac{2R}{C}\frac{df}{dt} + .7Rf_o,$$

where $R$ is the range rate in knots between the sonar and the target and $f_o$ is the mean transmitted frequency. If the target is stationary $$f \cong \frac{2R}{C}\frac{df}{dt} + .7\gamma \cos\theta f_o,$$

where $\gamma$ is the velocity of the sonar platform in knots and $\theta$ is the angle between the velocity vector and the direction to the target.

The duration of the echo (assuming a point target) is $\tau=\phi/\omega$ seconds where $\phi$ is the receiving beamwidth and $\omega$ is the rate at which the hydrophone is scanned in azimuth. If for example, $\phi=5°$ and $\omega$ is 30° per sec., the $\tau=5/30=0.166$ sec.

Referring to the overall block diagram, FIG. 1, to simulate the phenomena discussed above and the phenomena of reverberation, noise and "lost time" the programmable oscillator 18 is adjusted to a frequency F equal to that which would be generated by a moving or stationary target at range $R$ by means of a signal from the computer 10. The output of azimuth function generator 14 on line 20 causes the CRT 22 beam to sweep over the scope face corresponding to the changes in direction in which the receiving hydrophone (not shown) points. When the direction of the hydrophone (not shown) and the position of the beam agree with the azimuth at which a target is to appear, the programmed oscillator 18 is turned on by the gate 29 signal from azimuth function generator 14, feeding a signal through azimuth attenuator 26, gain adjuster 38 and summing network 40. The azimuth attenuator changes the level of the oscillator output as the azimuth changes in the same manner as the echo would change when a receiving hydrophone (not shown) scans past the target (not shown). The gain adjuster 38 changes the average intensity of the simulated echo and may be adjusted manually or automatically.

The output of the summing network 40 is applied to "lost time" gates 68 and 70, summing networks 82 and 88 and thence to band-pass filters 42 and 48. It is to be noted for simplicity only two band-pass filter channels have been shown. In a complete system 30 to 50 filters and gates would be used. Each filter passes a band of frequencies corresponding to a range interval $\Delta\gamma$. Detectors 44 and 50 rectify the filter outputs. The detectors are scanned sequentially by detector sampler 58. Signals of vertical scan and intensity are supplied from detector sampler 58 to the CRT 22. The detector scanning rate and the CRT vertical deflection rate are synchronized so that a signal (such as the output of the programmed oscillator) that lies within the passband of a given filter will cause an intensity modulated spot to appear at the same CRT range each vertical scan.

One output, line 20, of the azimuth function generator 14 is applied to the CRT horizontal detection input, causing the beam to move across the face of the tube. The target appears at the ordered azimuth over a sector corresponding to the receiving beamwidth. It is assumed for discussion that a "B" scope display is used.

Also appearing on the face of the CRT 22 will be signals caused by the reverberation noise generator 94, whose output is applied to gain adjuster 100, thence to range attenuation filter 96, to summing network 40 and to band-pass filters 42 and 48. The reverberation generator is a wide band source and causes random signals to appear on each channel with an intensity depending upon the adjustment of the gain control 100 and the reverberation spectrum as determined by range attenuation filter 96.

There are two related factors that will influence the design of the simulator. First, both desired echoes and reverberation become weaker with increasing range in a real world situation. Second, in an attempt to compensate for this fact CTFM receivers are designed to have a progressively greater response with increasing frequency, frequently at the rate of 9 to 12 db. per octave. For example, the response at 2,000 Hz. may be 24 db. greater than at 500 Hz. The compensation is not necessarily perfect, however. Detected noise is fairly uniform over this same frequency range so that the effect of the increased high-frequency amplification is to make the noise appear to be much stronger at the higher frequencies (longer ranges).

In the circuit of FIG. 1, the effect of less than perfect reverberation compensation is introduced by sloping off the reverberation by the range attenuation filter 96. That is, it is assumed that the gain of the particular receiver does not increase rapidly enough with frequency to compensate for the loss in amplitude of the reverberation at these frequencies.

Own ship, ambient and target noise is fed through a range compensation network 108 that raises the high-frequency components at the same rate as is normally accomplished in the receiver. Ambient, own ship and target noise is inserted as shown to the summing networks 82 and 88 to prevent it from passing through the "lost time" gates. "Lost time" applies only to target echoes and reverberation. The azimuth attenuator 116 is provided to cause the target noise to change in intensity as the simulated beam sweeps across the target. The target can be a noise source other than the one returning the echo if the problem computer is properly programmed.

In addition to being applied as signal voltages to the CRT, the simulated reverberation noise and signal are applied to summing network 19 and gain control 124 to the amplifier loudspeaker combination 126 and 128.

Several advantages of the above-described invention are apparent. The simulator is designed to be programmable and hence it is compatible with team training use. The duration of a training session is not limited by the length of an operational magnetic tape, hence tests of operator performance as a function of time can readily be carried out. Operator training in video adjustment is enhanced by the azimuth attenuator feature. The echo can be made to resemble either a simple point source or a multireflector echo whose apparent length is a function of aspect. A complex echo can be generated by "plugging in" a number of adjacent, simple echoes. All realistic features of operational equipment including "lost time" phenomena are attainable in simulation.

What is claimed is:

1. A frequency modulation sonar simulator comprising:
   computer means for receiving problem variables and providing outputs of azimuth and range command electrical signals;
   a programmable oscillator and azimuth function generator connected to receive respectively said range and azimuth signals from said computer means, said oscillator being programmed in frequency by said range command;

a first azimuth attenuator connected to said azimuth function generator and said oscillator to adjust the oscillator output level as the azimuth changes;

a first summing network connected to receive the output of said azimuth attenuator;

a cathode-ray tube device for displaying sonar signals;

a plurality of discrete band-pass filter networks, each including a band-pass filter connected to receive the output of said first summing network, each filter being selected to pass a band of frequencies corresponding to a range interval;

detector means connected to said band-pass filter networks;

a detector sampler circuit connected to sequentially sample said detector means and providing intensity and vertical deflection inputs to said cathode-ray tube;

said cathode-ray tube being connected to said azimuth function generator to receive horizontal deflection input to said tube.

2. Apparatus according to claim 1, including a range compensation network for receiving ambient noise and own ship noise electrical signals and connected to pass output signals to each of said band-pass filter circuits, to simulate on said cathode-ray tube conditions of ambient noise and own ship noise.

3. Apparatus according to claim 2, including a second azimuth attenuator for receiving target noise input electrical signals and an input from said azimuth function generator;

said second azimuth attenuator having an output connected to said range compensation network to simulate on said cathode-ray tube conditions of target noise.

4. Apparatus according to claim 1, including a plurality of lost time gates connected one to each of said band-pass filter circuits;

a range time base signaling means;

a lost time function generator connected to said range time base and to each of said lost time gates to pass an electrical signal input to each of said lost time gates;

said lost time gates being connected to said first summing network to provide a second electrical signal input to said lost time gates to provide on said cathode-ray tube an interruption of signal representing lost time phenomena.

5. Apparatus according to claim 1, including a range time base, a range attenuation filter and a reverberation generator;

said reverberation generator and said range time base being connected to provide input electrical signals to said range filter;

said range filter having an output connected to said first summing network to provide the effect of reverberation on said cathode-ray tube and to alter said effect in accordance with the range scale used.

* * * * *